United States Patent Office 3,822,218
Patented July 2, 1974

3,822,218
PRODUCTION OF ACTIVATED CARBON FROM RUBBER AND A CARBONACEOUS BINDER
Mack P. Whittaker, Stamford, Conn., and Lloyd I. Grindstaff, Elizabethton, Tenn., assignors to Great Lakes Carbon Corporation, New York, N.Y.
No Drawing. Filed Sept. 14, 1972, Ser. No. 289,098
Int. Cl. C01b 31/08
U.S. Cl. 252—421                            7 Claims

ABSTRACT OF THE DISCLOSURE

A dense, solid pellet of carbon suitable for activation is prepared from scrap rubber, tires, and other rubber vulcanizates by adding a carbonaceous binder to the rubber prior to destructive distillation thereof.

BACKGROUND OF THE INVENTION

The reuse of rubber tires and tire scrap has been the subject of numerous patents and articles from the early 1900's Pettigrew and Roniger of Uniroyal, Inc., have published a comprehensive review of the literature under a contract of the U.S. Environmental Protection Agency, Contract No. PH 86-68-208, as Publication No. SW-22-C, Part I (U.S.P.O., Washington, D.C. 20402, Stock No. 5502-0028).

More recently Wolfson et al. of Firestone Tire and Rubber Company and the U.S. Bureau of Mines have investigated the destructive distillation of scrap tires in a controlled atmosphere of oxygen (U.S. Bureau of Mines report of Investigation 7302, 1969). Beckman et al. U.S. 3,582,279, issued June 1, 1971, and assigned to Firestone, describes and claims this process for the destructive distillation of scrap tires and of other rubber vulcanizates.

According to the Beckman et al. patent, oxidative distillation of scrap rubber yields gaseous products useful as feedstock in cracking operations for the production of ethylene, propylene, etc.; liquid products comprising a complex mixture of saturated and unsaturated hydrocarbons, aromatics, and the oxidation of products thereof; and solid products useful as reinforcing agents or fillers for rubber, as filtering agents for the purification of water, as decolorizing agents for organic materials, and in the treatment of sewage and the like.

A more recent patent, Gotshall, U.S. 3,644,131, issued Feb. 22, 1972, discloses the nonoxidative destructive distillation of scrap rubber including tires, including grinding of the residual carbon char to an average particle size of 5 microns, and coating the char particles with an organic barrier. The coated particles are useful as a filler for reinforced elastomeric compositions.

SUMMARY OF THE INVENTION

This invention relates to an improvement in the destructive distillation of scrap rubber.

More particularly this invention pertains to a nonoxidative destructive distillation process for scrap rubber to obtain a solid residue with improved physical properties.

One of the more important uses for the present solid carbonaceous product of scrap tire distillation, is in the manufacture of activated carbon. Activated carbon finds use in the diminution of pollution of water and air. It also finds use in the purification and recovery of many valuable industrial materials. The most useful form for activated carbon for the above described uses is as a solid pellet which can be dispensed and transferred with a minimum amount of residue and soot arising therefrom.

By the methods of the Wolfson and Gotshall patents, the solid residue obtained from the distillation of scrap tires is a soft friable mass which has little or no structural or compressive strength. The product is easily milled to a fine powder. The more desirable form of activated carbon is the pellet or large, formed, flowable particle. In order to manufacture such a pellet, the carbon powder from the Beckman or Gotshall method can be mixed with a binder and extruded or otherwise formed into the desired pellets and then carbonized to at least about 700° C. prior to activation.

By the method of the present invention, a carbonaceous binder is mixed with the scrap rubber or rubber vulcanizates prior to the destructive distillation process. The resulting residue after distillation is a hard, dense solid which can be crushed to the desired size and activated forthwith. The product is particularly well adapted to being activated, as for example by steam, carbon dioxide, flue gases, or the like, to form an activated carbon product.

DETAILED DESCRIPTION OF THE INVENTION

The destructive distillation of scrap tires yields a variety of gaseous and liquid products which can be recovered and used as fuel sources, a monomer for polymerization processes, as a feedstock for hydrocarbon crackers, or the like. The solid residue is useful as a filler for natural and synthetic rubber products, as for example in the manufacture of new tires. The solid product can also be treated in a well-known manner to prepare activated carbon. It is for this latter purpose that the present invention is particularly suited.

As starting material for the present invention, one can use vulcanizates of synthetic rubber as for example polyisoprene, polybutadiene, polybutadiene-styrene, or natural rubbers. One can also use non-vulcanized synthetic or natural rubbers or mixtures of the foregoing.

Of particular interest, however, is the utilization of scrap rubber tires, scrap belts, footwear, padding, latex rubber, and the like. These materials can be mixed in any and all proportions. Tires generally contain a metal bead and a considerable amount of fibers as bands or belts in addition to the rubber. These bands or belts can comprise rayon, nylon, glass, and steel or mixtures thereof. It is preferable to remove the bead and any glass or steel belts from the tires prior to distillation; however, any carbonizable web or belt can be treated in the process of the present invention. The solid product therefrom is particularly well suited for the present intended use. The tires can be carbonized whole or can be cut into pieces depending upon the size of the carbonization chamber. Although commercial truck and passenger car tires contain different rubber formulations, no separation of tires by use or by manufacture need be made to practice the present invention.

The binder useful in this invention consists of a carbonaceous resin or pitch of high carbon yield when heated to a carbonizing temperature. Typical binders useful for the invention include coal tar pitch, petroleum pitch, asphalt, ethylene tar, phenol-formaldehyde resin, polyvinyl chloride resin, furfural resin, and the like.

Typically from about 20 to about 50 percent by weight of the charge should be binder in order to increase the density of the product to a usable value without adding substantially to the cost of the operation. A high proportion of binder will provide a more dense product, up to about the density of coke. While the higher densities are useful for the manufacture of activated carbon, they are not needed, and such a high proportion of binder would not usually be economically desirable.

The destructive distillation and carbonization is carried out in a furnace, retort, or slot-oven in the absence of any reactive gases (air, oxygen, or the like) or other materials. The distillate is condensed, recovered, and fractionated if desired. The gaseous product can be used as a fuel for the carbonization reaction in the conventional manner as for the operation of slot-ovens.

The mixture of rubber scrap and binder are charged into the retort and heated to a final temperature of 500–1000° C. to remove all volatilizable material. Alternatively, the material can be charged into a pre-heated oven, as for example a slot-oven held at the desired temperature range. The distillation can be carried out at sub-atmospheric or super-atmospheric pressures. In a preferred mode, however, normal atmospheric pressure is utilized. As heating is continued to higher temperatures, additional volatiles will be formed, lowering the char yield, until a substantially entirely carbon residue remains.

After distillation, the residue is cooled, removed, ground to a desired size in a conventional ball or roller mill and activated by high pressure steam in a manner well known to the art, as for example by the method of Hassler "Active Carbon," Chemical Publishing Co. Inc., Brooklyn, N.Y., 1951, page 15.

The following example is provided to further describe the present invention.

A mixture of coal tar pitch, 3000 grams, and rubber tire scrap, 7000 grams, was carbonized in a retort to a final temperature of 600° C. over an 8 hour period. The gaseous and liquid products were condensed and recovered. Upon cooling, the solid carbon residue was removed. Yield: 58.3 percent by weight. This residue was ground to −8 +14 mesh (U.S.) and activated by high pressure steam at 920° C. for 5.5 hours to give an overall yield of 33.5 percent activated carbon with a surface area of 508 square meters per gram. Methylene blue absorption, 66 milligrams per gram; by the method of Hassler, loc. cit., page 340 (using the electrophotometer method described on page 341 et seq.).

We claim:

1. In a process for the preparation of activated carbon which comprises:
   (a) nonoxidatively destructively distilling a member of the class consisting of the vulcanizates of synthetic rubber, the vulcanizates of natural rubber, non-vulcanized synthetic rubber, non-vulcanized natural rubber, and mixtures thereof;
   (b) isolating the residue therefrom; then activating the residue, the improvement which consists of adding to the rubber materials prior to the destructive distillation about 20 to about 50 weight percent of a carbonaceous resin or pitch binder of high carbon yield when heated to a carbonizing temperature.

2. The process of Claim 1 wherein the destructive distillation is a nonoxidative destructive distillation.

3. The process of Claim 2 where the nonoxidative destructive distillation is carried out in a slot-oven.

4. The process of Claim 1 wherein the residue is ground to −8 to +14 mesh (N.S.) prior to activation.

5. The process of Claim 1 wherein the activation is a high pressure steam activation.

6. The process of Claim 1 wherein the binder is coal tar pitch.

7. The process of Claim 1 wherein the vulcanizates of synthetic rubber consists of scrap rubber tires.

References Cited

UNITED STATES PATENTS

| | | | |
|---|---|---|---|
| 3,674,433 | 7/1972 | Wyatt | 423—450 |
| 3,700,615 | 10/1972 | Scott | 423—449 |
| 3,420,913 | 1/1969 | Railsback | 260—763 |
| 3,533,961 | 10/1970 | Voet | 252—421 |
| 2,008,145 | 7/1935 | Morrell | 252—421 |
| 3,018,288 | 1/1962 | Tokime et al. | 252—421 |
| 3,644,131 | 2/1972 | Gotshall | 260—763 |
| 3,704,108 | 11/1972 | Alpert | 201—25 |
| 3,582,279 | 6/1971 | Beckman et al. | 252—421 |

FOREIGN PATENTS

| | | | |
|---|---|---|---|
| 579,171 | 10/1924 | France | 201—25 |

DANIEL E. WYMAN, Primary Examiner

P. E. KONOPKA, Assistant Examiner

U.S. Cl. X.R.

106—307; 208—2.5, 25; 252—445; 260—41.5 R, 763; 423—449